United States Patent
Jain et al.

(10) Patent No.: US 9,436,454 B1
(45) Date of Patent: Sep. 6, 2016

(54) SCALABLE SYSTEMS AND METHODS FOR PROVIDING ORDERED UPDATE DELIVERY

(71) Applicant: Google Inc., Mountain View, CA (US)

(72) Inventors: Sushant Jain, Sunnyvale, CA (US); Yi Feng, Mountain View, CA (US); Anurag Agarwal, Sunnyvale, CA (US); Nahi OJeil, San Francisco, CA (US)

(73) Assignee: Google Inc., Mountain View, CA (US)

( * ) Notice: Subject to any disclaimer, the term of this patent is extended or adjusted under 35 U.S.C. 154(b) by 370 days.

(21) Appl. No.: 14/043,672

(22) Filed: Oct. 1, 2013

(51) Int. Cl.
G06F 9/44 (2006.01)
G06F 12/0866 (2016.01)
H04W 72/04 (2009.01)
G06F 9/445 (2006.01)

(52) U.S. Cl.
CPC ........................................ *G06F 8/65* (2013.01)

(58) Field of Classification Search
CPC .......... H04M 2207/185; H04W 72/04; H04L 69/166; G06F 3/06
See application file for complete search history.

(56) References Cited

U.S. PATENT DOCUMENTS

| | | | | |
|---|---|---|---|---|
| 6,163,540 A * | 12/2000 | Cheung et al. | ............... | 370/394 |
| 6,453,326 B1 * | 9/2002 | Parham et al. | | |
| 7,310,331 B2 * | 12/2007 | Sjoblom | ............. | H04L 63/0428 370/353 |
| 7,822,731 B1 * | 10/2010 | Yu et al. | ........................ | 707/705 |
| 7,822,779 B2 * | 10/2010 | Chang | .................... | G06Q 10/08 707/802 |
| 7,852,845 B2 * | 12/2010 | Holt | ........................... | G06F 9/54 370/394 |
| 8,328,640 B2 | 12/2012 | Rom et al. | | |
| 2002/0143971 A1 * | 10/2002 | Govindarajan et al. | ...... | 709/230 |
| 2008/0140805 A1 * | 6/2008 | Holt | ........................ | H04L 67/10 709/217 |
| 2009/0063749 A1 * | 3/2009 | Dow | ....................... | G06F 12/08 711/6 |
| 2009/0217274 A1 * | 8/2009 | Corbin | ..................... | G06F 9/466 718/101 |
| 2009/0279569 A1 * | 11/2009 | Reddy | ........................... | 370/474 |
| 2011/0307581 A1 | 12/2011 | Furbeck et al. | | |
| 2012/0155438 A1 * | 6/2012 | Shin | ..................... | H04W 28/065 370/336 |
| 2014/0136529 A1 * | 5/2014 | Zhang | ............... | G06F 17/30486 707/723 |
| 2014/0351527 A1 * | 11/2014 | Traut | ...................... | G06F 3/061 711/154 |

* cited by examiner

*Primary Examiner* — Chat Do
*Assistant Examiner* — Devayani R Talukdar
(74) *Attorney, Agent, or Firm* — Fish & Richardson P.C.

(57) ABSTRACT

Scalable systems and methods for delivering ordered data updates from a plurality of data sources are provided. A described method includes receiving, a data update from a data source and assigning a global sequence identifier and a previous global sequence identifier to the data update. The global sequence identifier indicates a position of the data update in a sequence of data updates received from a plurality of data sources. The previous global sequence identifier is a global sequence identifier assigned to a preceding data update received from the same data source. The method further includes determining whether the preceding data update from the same data source has been delivered by comparing the previous global sequence identifier with a low water mark. The low water mark is an upper bound on a range of global sequence identifiers associated with data updates that have been delivered.

19 Claims, 4 Drawing Sheets

SCALABLE SYSTEMS AND METHODS FOR PROVIDING ORDERED UPDATE DELIVERY

BACKGROUND

In a computer network, data updates are often provided from a data source (e.g., a user device, a web application, a customer, etc.) to a data consumer (e.g., a database, a processing system, etc.). Typically, a computer server or other intermediary system receives data updates from a plurality of different data sources and delivers the data updates to a downstream data consumer. The order in which the updates are delivered to the data consumer is often critical. For example, if the updates from a particular data source are "delta updates" (e.g., updates which build upon or refer to a preexisting data structure), the updated data may only make sense semantically if the updates are delivered to the data consumer in a particular order (e.g., the order in which the data updates are generated by the data source). It is difficult and challenging to ensure that updates from a large number of data sources (e.g., thousands, millions, etc.) are delivered efficiently and in the proper order.

SUMMARY

One implementation of the present disclosure is a scalable method for delivering ordered data updates from a plurality of data sources. The method includes receiving, at a computer system, a data update from a data source and assigning, by the computer system, a global sequence identifier and a previous global sequence identifier to the data update. The global sequence identifier indicates a position of the data update in a sequence of data updates received from a plurality of data sources. The previous global sequence identifier is a global sequence identifier assigned to a preceding data update received from the data source. In some implementations, the preceding data update is a most recent previous data update received from the data source. The method further includes identifying a low water mark. The low water mark is an upper bound on a range of global sequence identifiers associated with data updates that have been delivered. The method further includes determining, by the computer system, whether the preceding data update from the data source has been delivered. The determination includes comparing the previous global sequence identifier with the low water mark. The method further includes delivering the data update in response to a determination that the preceding data update from the data source has been delivered.

In some implementations, the data update includes a source-specific sequence identifier indicating a position of the data update in a sequence of data updates received from the data source. The sequence of data updates received from the data source may define an order in which a plurality of data updates from the data source must be delivered.

In some implementations, the method further includes maintaining a transaction database including a data source identifier for each of the plurality of data sources and a global sequence identifier associated with each data source identifier, identifying, in the transaction database, the data source identifier corresponding to the data source from which the data update is received, and updating, in the transaction database, the global sequence identifier associated with the identified data source identifier. Updating the associated global sequence identifier in the transaction database may include replacing the associated global sequence identifier in the transaction database with the global sequence identifier assigned to the data update from the data source.

In some implementations, assigning the previous global sequence identifier to the data update includes identifying the global sequence identifier associated with the identified data source identifier and using the identified global sequence identifier as the previous global sequence identifier assigned to the data update. In some implementations, identifying the global sequence identifier is performed prior to updating the global sequence identifier.

In some implementations, the method further includes comparing a global sequence identifier of delivered data update with the low water mark and determining whether to update the low water mark based on a result of the comparison.

In some implementations, the low water mark defines a threshold global sequence identifier indicating that all data updates having a global sequence identifier less than the threshold global sequence identifier have been delivered. Determining whether to update the low water mark may include determining whether the global sequence identifier of the delivered data update matches the low water mark. In some implementations, the method further includes increasing the low water mark in response to a determination that the global sequence identifier of the delivered data update matches the low water mark.

Another implementation of the present disclosure is a scalable system for delivering ordered data updates from a plurality of data sources. The system includes a communications interface and a processing circuit. The communications interface is configured to receive a data update from a data source. The processing circuit includes a global sequence ID module configured to assign a global sequence identifier to the data update and a previous global sequence ID module configured to assign a previous global sequence identifier to the data update. The global sequence identifier may indicate a position of the data update in a sequence of data updates received from a plurality of data sources and previous global sequence identifier may be a global sequence identifier assigned to a preceding data update received from the data source. In some implementations, the preceding data update is a most recent previous data update received from the data source. The processing circuit further includes a low water mark module configured to identify a low water mark. The low water mark may be an upper bound on a range of global sequence identifiers corresponding to data updates that have been delivered. The processing circuit further includes a delivery determination module configured to determine whether the preceding data update from the data source has been delivered. The determination includes comparing the previous global sequence identifier with the low water mark. The processing circuit further includes an update delivery module configured to deliver the data update in response to a determination that the preceding data update from the data source has been delivered.

In some implementations, the data update includes a source-specific sequence identifier indicating a position of the data update in a sequence of data updates received from a single data source. The sequence of data updates received from the single data source may define an order in which to deliver a plurality of data updates from the single data source.

In some implementations, the processing circuit further includes a transaction database module. The transaction database module may be configured to maintain a transaction database including a data source identifier for each of the plurality of data sources and a global sequence identifier associated with each data source identifier, identify, in the transaction database, the data source identifier corresponding to the data source from which the data update is received, and update, in the transaction database, the global sequence identifier associated with the identified data source identifier. Updating the associated global sequence identifier in the transaction database may include replacing the associated global sequence identifier in the transaction database with the global sequence identifier assigned to the data update from the data source.

In some implementations, assigning the previous global sequence identifier to the data update includes identifying, in the transaction database, the global sequence identifier associated with the identified data source identifier and using the identified global sequence identifier as the previous global sequence identifier assigned to the data update. Identifying the global sequence identifier may be performed prior to updating the global sequence identifier.

In some implementations, the low water mark module is further configured to compare the global sequence identifier of a delivered data update with the low water mark, and determine whether to update the low water mark based on a result of the comparison.

In some implementations, the low water mark defines a threshold global sequence identifier indicating that all data updates having a global sequence identifier less than the threshold global sequence identifier have been delivered. Determining whether to update the low water mark may include determining whether the global sequence identifier of the delivered data update matches the low water mark. In some implementations, the method further includes increasing the low water mark in response to a determination that the global sequence identifier of the delivered data update matches the low water mark.

Another implementation of the present disclosure is a scalable method for delivering ordered data updates from a plurality of data sources. The method includes receiving, at a computer system, a data update from a data source and identifying, by the computer system, a global sequence identifier and a previous global sequence identifier associated with the data update. The global sequence identifier may indicate a position of the data update in a sequence of data updates received from a plurality of data sources, and the previous global sequence identifier may be a global sequence identifier associated with a preceding data update received from the data source. The method further includes determining, by the computer system, whether to deliver the data update. Determining whether to deliver the data update may include comparing the previous global sequence identifier with a threshold value. In some implementations, the threshold value is an upper bound on a range of global sequence identifiers of data updates that have been delivered. The method further includes delivering the data update in response to a determination that the previous global sequence identifier is less than the threshold value.

In some implementations, determining whether to deliver the data update further includes, in response to a determination that the previous global sequence identifier is not less than the threshold value, determining whether the preceding data update received from the data source has been delivered. In some implementations, the method further includes delivering the data update in response to a determination that the preceding data update received from the data source has been delivered.

In some implementations, determining whether the preceding data update received from the data source has been delivered includes obtaining delivery status information for the preceding data update from a delivery status database. The delivery status database may include delivery status information for only data updates having a global sequence identifier that is not less than the threshold value.

In some implementations, the method further includes determining whether to increase the threshold value. Determining whether to increase the threshold value may be performed in response to at least one of: a decision to deliver the data update, and delivering the data update.

In some implementations, determining whether to increase the threshold value includes identifying a lowest global sequence identifier exceeding the range bounded by the threshold value, determining whether the global sequence identifier of the data update matches the identified lowest global sequence identifier, and deciding to increase the threshold value in response to a determination that the global sequence identifier of the data update matches the identified lowest global sequence identifier.

DETAILED DESCRIPTION

Figure 1:
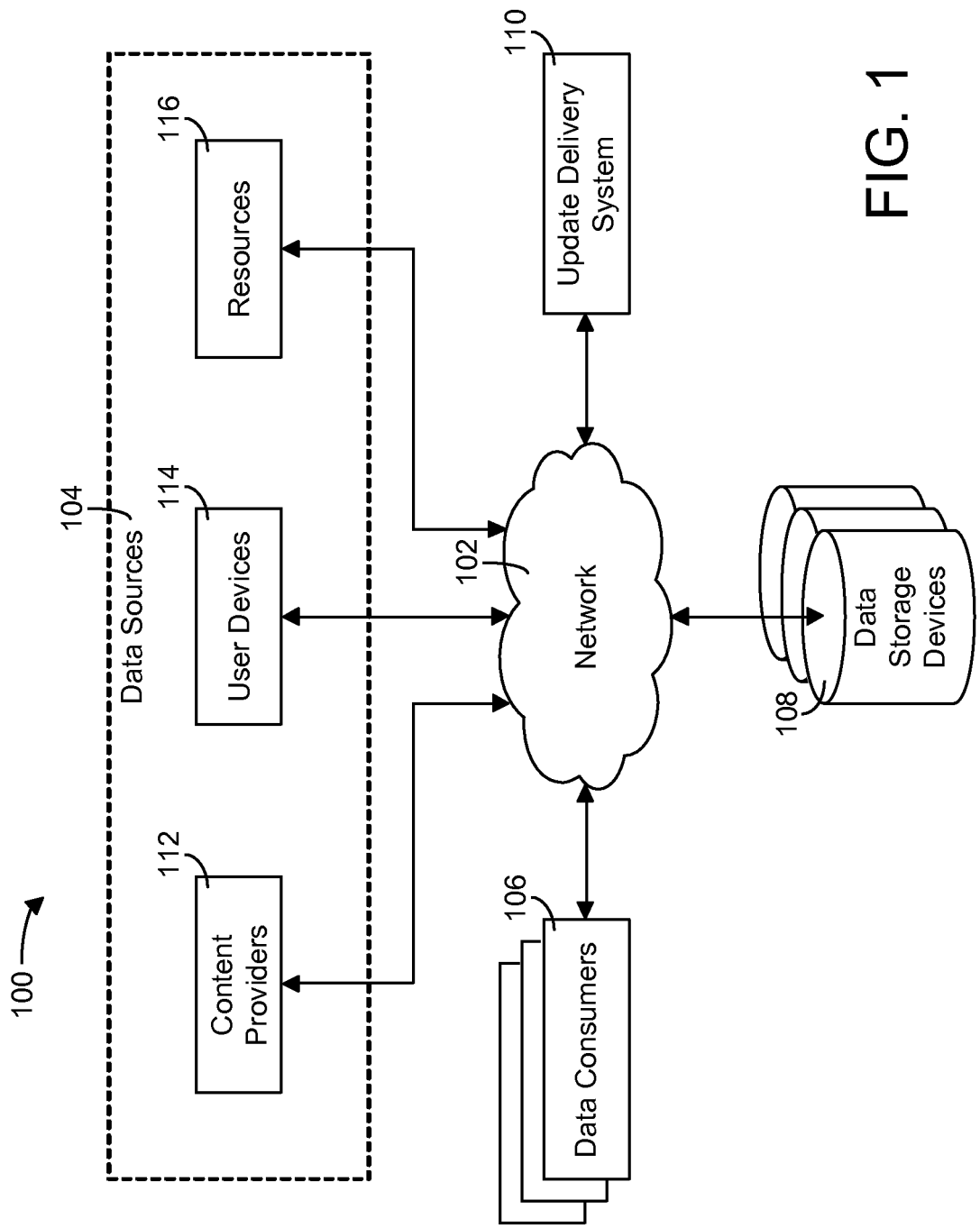
FIG. 1 is a drawing of a computer system including an update delivery system configured to receive data updates from a plurality of data sources and deliver the data updates in a proper order to a data consumer, shown according to a described implementation.

Referring generally to the FIGURES, systems and methods for providing ordered update delivery are shown, according to a described implementation. The systems and methods described herein may be used to receive data updates from a plurality of data sources (e.g., user devices, applications, computers or computer systems, computer servers, upstream processes, customers, etc.) and deliver the data updates to one or more data consumers (e.g., a database, a processing system, a downstream a system or process that consumes or uses the updated data, etc.). The data updates may include, for example, updates to an online account or profile (e.g., updated user information, updated account information, updated profile information, etc.), updates to configuration settings or parameters used to control a device or system (e.g., updated tuning parameters, control parameters, control logic, etc.), updates to a listing of keywords or keyword bids used by a content serving system, updates to measurement or sensory data, updates to a data log (e.g., an event log, a web hits log, etc.), or any other type of data update which may be used to modify or replace an existing data structure and/or to create a new data structure.

The systems and methods of the present disclosure may be used to ensure that data updates received from a particular data source are delivered to the data consumer in a proper order or sequence. The order in which the updates are delivered may be important for implementations in which the updates are "delta updates" (e.g., updates which build upon or refer to a preexisting data structure). Delta updates may only make sense semantically if delivered to the data consumer in a particular order (e.g., the order in which the updates are generated by the data source).

In some implementations, the proper order in which a series of updates must be delivered applies only to updates received from the same data source. For example, each of the data updates in a set of updates received from a first data source may have a proper delivery order relative to other data updates in the set of updates received from the first data source. However, the data updates received from the first data source may be delivered in any order relative to data updates received from a second data source, a third data source, or any other data source. Each of the plurality of data sources may generate multiple data updates which must be delivered to the data consumer in a specific order relative to other data updates received from the same data source.

Conventional update delivery systems typically ensure a proper delivery sequence by tracking a "sequence ID" of the most recently delivered update from each data source. For example, conventional update delivery systems typically assign each data update a source-specific sequence ID (e.g., based on the order in which the updates are received from the data source). The data updates are then delivered to the data consumer in an order defined by the sequence. This technique ensures a proper delivery sequence but requires the update delivery system to keep track of the sequence IDs of the most recently delivered updates for each of the plurality of data sources. The amount of state information required to track the sequence IDs is typically proportional to the number of data sources (e.g., one sequence ID for every data source). Conventional update delivery systems are not feasibly scalable to a large number (e.g., potentially millions) of data sources The systems and methods described herein are scalable to any number of data sources (e.g., thousands, millions, billions, etc.) without requiring a proportional amount of state information to be tracked, stored, or otherwise maintained. For example, an update delivery system in accordance with the present disclosure assigns each update received from any of the plurality of data sources a unique "global sequence ID." The global sequence ID indicates a position of the data update in a global sequence of data updates which includes data updates received from multiple data sources. The global sequence ID may be used to uniquely identify a particular data update without referring to the data source from which the data update is received.

In some implementations, the update delivery system maintains a transaction database (e.g., a table, a matrix, a vector, etc.) relating each of the plurality of data sources to a global sequence ID most recently assigned to a data update from the data source. For example, the transaction database may be a table including an identifier for each of the plurality of data sources (e.g., a data source ID, a customer ID, etc.) and a global sequence ID associated with each of the data source identifiers. Each time a global sequence ID is assigned to a data update from a particular data source, the global sequence ID associated with the particular data source may be updated in the transaction database. The transaction database may be used to determine the most recent (e.g., highest) global sequence ID assigned to data updates from each of the plurality of data sources.

The update delivery system may assign each data update a "previous global sequence ID." The previous global sequence ID may correspond to the global sequence ID of the most recent previous data update from the same data source. The previous global sequence ID may be determined by referencing the transaction database. For example, each time a data update is received, the update delivery system may identify the data source of the data update (e.g., using an attribute or dimension of the update itself) and use the transaction database to lookup the most recently assigned global sequence ID corresponding to the identified data source. The most recently assigned global sequence ID may then be assigned to the data update as the previous global sequence ID of the data update.

The update delivery system may use the previous global sequence ID for a data update to determine whether the data update may be delivered to the data consumer. For example, the update delivery system may keep track of which data updates have been delivered to the data consumer using the global sequence IDs assigned to each of the data updates. For an update that has not been delivered (i.e., a "non-delivered" update), if the update corresponding to the previous global sequence ID of the non-delivered update has already been delivered, the update delivery system may determine that the non-delivered update is the next update in the sequence of updates from the same data source. Upon determining that the non-delivered update is the next update in the sequence of updates, the update delivery system may proceed to deliver the non-delivered update to the data consumer.

The update delivery system may summarize a range of global sequence IDs which have already been delivered using the concept of a "Low Water Mark" (LWM). For example, if all updates having a global sequence ID less than two hundred have been delivered, the update delivery system may set the LWM at two hundred. If a non-delivered update has a previous global sequence ID of less than the LWM, the update delivery system may determine that the most recent previous data update from the same data source has already been delivered and may proceed to deliver the non-delivered update to the data consumer.

By assigning each data update a global sequence ID and a previous global sequence ID and by using the LWM concept to summarize a range of global sequence IDs, the update delivery system can determine whether to deliver any non-delivered update without storing an amount of state information proportional to the number of data sources. Additionally, the update delivery system can identify and isolate a sequence of updates from any data source (e.g., using the previous global sequence IDs and global sequence IDs of the updates in the sequence). The update delivery system can deliver updates from each of the plurality of data sources independently (e.g., in independent delivery sequences defined by a chain of previous global sequence IDs and global sequence IDs) without waiting to deliver updates from other data sources.

Other aspects, inventive features, and advantages of the systems and methods described herein will become apparent in the detailed description set forth below taken in conjunction with the accompanying drawings.

Referring now to FIG. 1, a block diagram of a computer system 100 is shown, according to a described implementation. In brief overview, computer system 100 is shown to include a network 102, data sources 104, data consumers 106, data storage devices 108, and an update delivery system 110. Computer system 100 may facilitate communication between data sources 104, update delivery system 110, and data consumers 106. For example, data sources 104 may generate or provide data updates to update delivery system 110 via network 102. Update delivery system 110 may process the data updates (e.g., assign the updates global sequence ID and previous global sequence ID attributes, determine a proper delivery order, etc.) and deliver the data updates to data consumers 106. In some implementations, data consumers 106 may be connected with update delivery system 110 directly. In other implementations, data consumers 106 may be connected with update delivery system 110 via network 102.

Still referring to FIG. 1, and in greater detail, computer system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, data sources 104 may communicate wirelessly (e.g., via WiFi, cellular, radio, etc.) with a transceiver that is hardwired (e.g., via a fiber optic cable, a CAT5 cable, etc.) to a computing device of network 102.

Still referring to FIG. 1, computer system 100 is shown to include data sources 104. Data sources 104 may include any type of data source capable of generating (e.g., creating) or providing (relaying, transmitting, etc.) a data structure over network 102. For example, data sources 104 are shown to include content providers 112, user devices 114, and resources 116.

Content providers 112 may include one or more electronic devices representing advertisers, resource operators, business owners, or other entities capable of producing, confirming, or requesting content items. For example, content providers 112 may produce content items (e.g., an ad creative) for presentation to user devices 114. In other implementations, content providers 112 may submit a request to have content items automatically generated. In some implementations, the content items may be advertisements. The advertisements may be display advertisements such as image advertisements, Flash® advertisements, video advertisements, text-based advertisements, or any combination thereof. In other implementations, the content items may include other types of content which serve various non-advertising purposes. The content items may be stored in one or more data storage devices local to content providers 112 or remote to content providers 112 (e.g., or in data storage devices 108).

Content providers 112 may submit various types of data updates to update delivery system 110. In some implementations, content providers 112 submit campaign parameters used to control the distribution of content items to user devices 114. The campaign parameters may include keywords associated with the content items, bids corresponding to the keywords, a content distribution budget, geographic limiters, or other criteria used to determine when a content item may be presented to user devices 114. The data updates may include updated campaign parameters, updated content items, updated account information or profile information, or any other type of data update associated with content providers 112.

Still referring to FIG. 1, in some implementations, data sources 104 include user devices 114. User devices 114 may include any number and/or type of user-operable electronic devices. For example, user devices 114 may include desktop computers, laptop computers, smartphones, tablets, mobile communication devices, remote workstations, client terminals, entertainment consoles, or any other devices capable of interacting with the other components of computer system 100 (e.g., via a communications interface). User devices 114 may include mobile devices or non-mobile devices. In some implementations, content providers 112 may use user devices 114 to send data updates to update delivery system 110.

In some implementations, user devices 114 include an application (e.g., a web browser, a resource renderer, etc.) for converting electronic content into a user-comprehensible format (e.g., visual, aural, graphical, etc.). User devices 114 may include a user interface element (e.g., an electronic display, a speaker, a keyboard, a mouse, a microphone, a printer, etc.) for presenting content to a user, receiving user input, or facilitating user interaction with update delivery system 110 or data consumers 106. User devices 114 may function as a user agent for allowing a user to view HTML encoded content. User devices 114 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented.

User devices 114 may submit various types of data updates to update delivery system 110. For example, data updates received from user devices 114 may include updated profile information, updated account information, updated user information, updated behavior metrics, updated transaction information, and/or other types of updated information associated with user devices 114.

In some implementations, user devices 114 may be capable of detecting an interaction with a distributed content item. An interaction with a content item may include displaying the content item, hovering over the content item, clicking on the content item, viewing source information for the content item, or any other type of interaction between user devices 114 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 112, or by a content server.

User devices 114 may generate updated event data in response to a detected interaction with a content item. The updated event data may include a plurality of attributes including a content identifier (e.g., a content ID or signature element), a device identifier, a referring URL identifier, an event timestamp, or any other attributes describing the interaction. User devices 114 may generate event data when particular actions are performed by a user device (e.g., resource views, online purchases, search queries submitted, etc.). The event data generated by user devices 114 may be communicated to update delivery system 110 via network 102.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 114, etc.) and used.

Still referring to FIG. 1, in some implementations, data sources 104 include resources 116. Resources 116 may be identified by a resource address associated with each resource (e.g., a uniform resource locator (URL)). Resources 116 may include web pages (e.g., HTML web pages, PHP web pages, etc.), word processing documents, portable document format (PDF) documents, images, video, programming elements, interactive content, streaming video/audio sources, or other types of electronic information. Resources 116 may include content (e.g., words, phrases, images, sounds, etc.) having embedded information (e.g., meta-information embedded in hyperlinks) and/or embedded instructions. Embedded instructions may include computer-readable instructions (e.g., software code, JavaScript®, ECMAScript®, etc.) which are executed by user devices 108 (e.g., by a web browser running on user devices 114).

Resources 116 may submit various types of data updates to update delivery system 110. For example, in some implementations, resources 116 generate data updates (e.g., updated event data) when resource content is viewed, requested, presented, accessed, or in response to any other type of action or occurrence with respect to resource content. Resources 116 may generate data updates associated with third party content items presented via resources 116 (e.g., updates to impression events, click events, etc.). In some implementations, resources 116 generate conversion events in response to an action or behavior (e.g., by user devices 114) which satisfies conversion criteria (e.g., online purchases, click-through paths, etc.). Resources 116 may communicate data updates to update delivery system 110 via network 102.

Still referring to FIG. 1, computer system 100 is shown to include data consumers 106. In some implementations data consumers 106 include a single data consumer. In other implementations, multiple data consumers 106 may be present. Data consumers 106 may include any system, device, application, process, or other entity that consumes or uses the data updates provided by update delivery system 110 (e.g., a database, a processing system, a downstream a system or process that consumes or uses data, etc.). For example, in some implementations, data consumers 106 may include a content server configured to select and deliver content items to user devices 114.

The content server may select a content item determined to be relevant to particular resource 116, user device 114, or search query. For example, the content server may select a content item by comparing the keywords associated with each content item (e.g., specified by content providers 112, additional keywords extracted from the content item, etc.) with the keywords associated with the resource 116 or user device 114 requesting the content item. The keywords specified by content providers 112 or extracted from the content item may be provided as data updates to update delivery system 110 and subsequently delivered to data consumers 106 for use in selecting a relevant content item.

In some implementations, the content server may select a content item by comparing the keywords associated with each content item with information (e.g., profile data, user preferences, etc.) associated with a particular user device 114 requesting the content item. In some implementations, the content server may select a content item that does not match established user preferences if an insufficient number of preferred content items are available. In some implementations, the content server may select a content item based on an established click-through-rate, a predicted click-through-rate, a bid price associated with each content item, or other relevant selection criteria. The information associated with a particular user device 112 or other selection criteria may be provided as data updates to update delivery system 110 and delivered to data consumers 106 for use in selecting a content item.

Still referring to FIG. 1, computer system 100 is shown to include data storage devices 108. Data storage devices 108 may be any type of memory device capable of storing profile data, content item data, user preference data, campaign parameter data, or any other type of data used by data consumers 106. Data storage devices 108 may be used to store non-delivered data updates (e.g., updates which have been received from data sources 104 but have not yet been delivered to data consumers 106) and/or delivered updates (e.g., updates which have been delivered to data consumers 106). In some implementations, data storage devices 108 may be combined with data consumers 106. For example, data storage devices 108 may be a data consumer 106 and may be configured to use or store (e.g., consume) the updated data delivered by update delivery system 110.

Data storage devices 108 may include any type of non volatile memory, media, or memory devices. For example, data storage devices 108 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, data storage devices 108 may be local to update delivery system 110, data consumers 106, and/or data sources 104. In other implementations, data storage devices 108 may be remote data storage devices connected with update delivery system 110, data consumers 106, or data sources 104 via network 102.

Still referring to FIG. 1, computer system 100 is shown to include an update delivery system 110. Update delivery system 110 may receive data updates from data sources 104 and deliver the data updates to data consumers 106. In some implementations, the data updates may include one or more attributes or dimensions. For example, a data update may include a "source ID" attribute indicating a particular data source from which the data update is received and/or a "source-specific sequence ID" attribute indicating a position of the data update in a sequence of data updates from the same data source. Update delivery system 110 may determine a proper order or sequence in which to deliver the data updates to data consumers 106. For example, update delivery system 110 may assign each data update a "global sequence ID." The global sequence ID indicates a position of the data update in a global sequence of data updates which includes data updates received from multiple data sources 104. The global sequence ID may be used to uniquely identify a particular data update without referring to the data source 104 from which the data update is received.

Update delivery system 110 may assign each data update a "previous global sequence ID." The previous global sequence ID may correspond to the global sequence ID of the most recent previous data update from the same data source. Update delivery system 110 may use the previous global sequence ID for a data update to determine whether the data update may be delivered to data consumers 106. For example, update delivery system 110 may keep track of which data updates have been delivered to the data consumer using the global sequence IDs assigned to each of the data updates. For an update that has not been delivered (i.e., a "non-delivered" update), if the update corresponding to the previous global sequence ID of the non-delivered update has already been delivered, update delivery system 110 may determine that the non-delivered update is the next update in the sequence of updates from the same data source 104. Upon determining that the non-delivered update is the next update in the sequence of updates, update delivery system 110 may proceed to deliver the non-delivered update to data consumers 106.

Update delivery system 110 may summarize a range of global sequence IDs which have already been delivered using the concept of a "Low Water Mark" (LWM). For example, if all updates having a global sequence ID less than two hundred have been delivered, update delivery system 110 may set the LWM at two hundred. If a non-delivered update has a previous global sequence ID of less than the LWM, update delivery system 110 may determine that the most recent previous data update from the same data source 104 has already been delivered and may proceed to deliver the non-delivered update to data consumers 106. Update delivery system 110 is described in greater detail with reference to FIG. 2.

Figure 2:
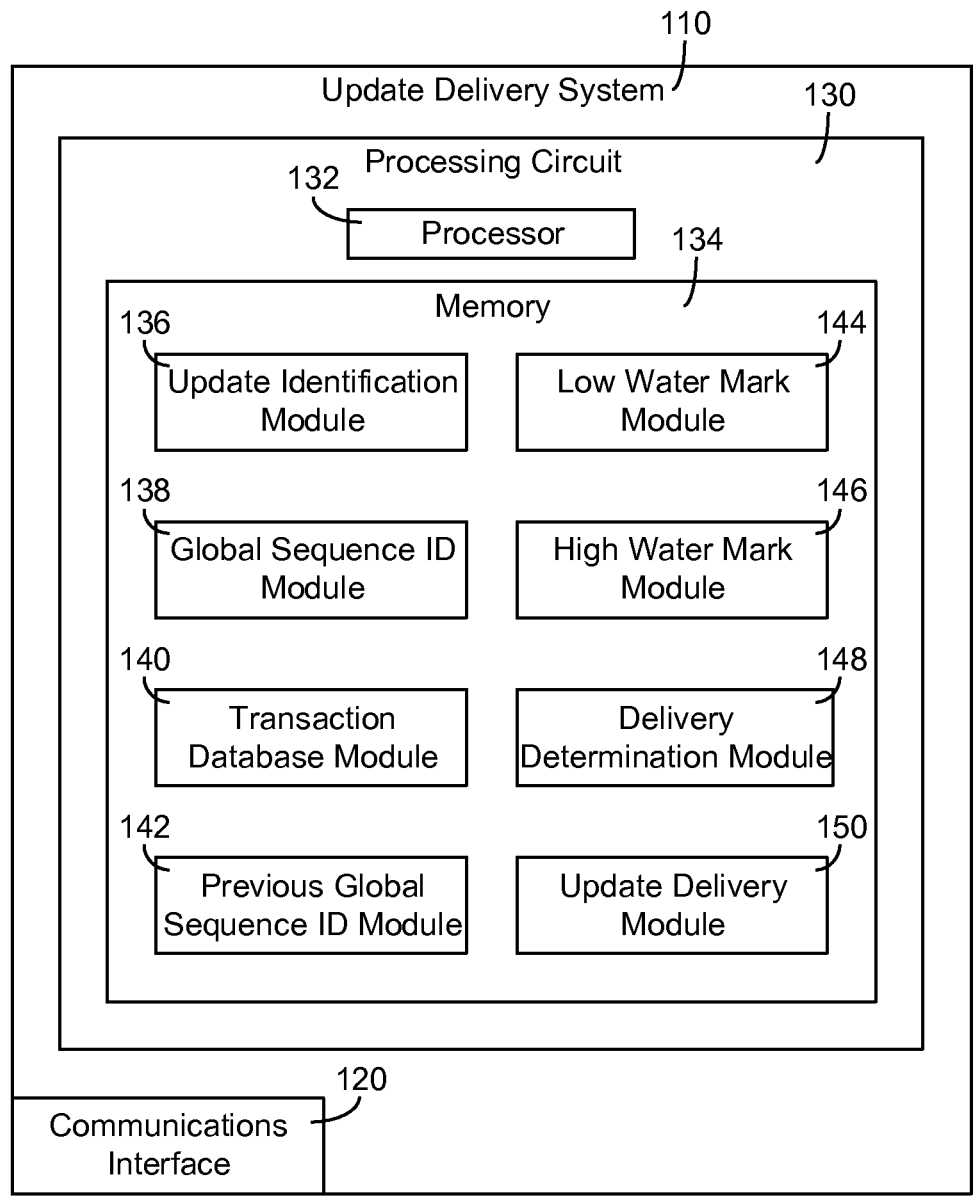
FIG. 2 is a block diagram illustrating the update delivery system of FIG. 1 in greater detail, shown according to a described implementation.

Referring now to FIG. 2, a block diagram illustrating update delivery system 110 in greater detail is shown, according to a described implementation. Update delivery system 110 is shown to include a communications interface 120 and a processing circuit 130. Communications interface 120 may include wired or wireless interfaces (e.g., jacks, antennas, transmitters, receivers, transceivers, wire terminals, Ethernet ports, WiFi transceivers, etc.) for conducting data communications with local or remote devices or systems. Communications interface 120 may allow update delivery system 110 to communicate with network 102, data sources 104, data consumers 106, and data storage devices 108. For example, communications interface 120 may be used to receive data updates from data sources 104 and deliver data updates to data consumers 106.

Still referring to FIG. 2, processing circuit 130 is shown to include a processor 132 and memory 134. Processor 132 may be implemented as a general purpose processor, an application specific integrated circuit (ASIC), one or more field programmable gate arrays (FPGAs), a CPU, a GPU, a group of processing components, or other suitable electronic processing components.

Memory 134 may include one or more devices (e.g., RAM, ROM, flash memory, hard disk storage, etc.) for storing data and/or computer code for completing and/or facilitating the various processes, layers, and modules described in the present disclosure. Memory 134 may comprise volatile memory or non-volatile memory. Memory 134 may include database components, object code components, script components, or any other type of information structure for supporting the various activities and information structures described in the present disclosure. In some implementations, memory 134 is communicably connected to processor 132 via processing circuit 130 and includes computer code (e.g., data modules stored in memory 134) for executing one or more processes described herein. In brief overview, memory 134 is shown to include an update identification module 136, a global sequence ID module 138, a transaction database module 140, a previous global sequence ID module 142, a low water mark module 144, a high water mark module 146, a delivery determination module 148, and an update delivery module 150.

Still referring to FIG. 2, memory 134 is shown to include an update identification module 136. Update identification module 136 may receive data updates from data sources 104 (e.g., via communications interface 120) and perform one or more initial processing steps. For example, update identification module 136 may identify a particular data source 104 from which a data update is received. In some implementations, a data source identifier (e.g., a tag, an attribute, a dimension, etc.) may be associated with the data update at the time the update is received (e.g., as embedded data, metadata, etc.). For example, data sources 104 may tag or mark data updates with a "source ID" attribute (e.g., <source_1>, <source_2>, etc.) prior to sending the data updates to update delivery system 110. In some instances, identifying a data source 104 includes reading the data source identifier included with the data update.

In other implementations, update identification module 136 determines the identify of a the data source 104 from which a data update is received without reference to a previously-existing source ID attribute. Update identification module 136 may add a previously non-existing source ID attribute to a data update or modify a previously-existing source ID attribute (e.g., to comply with a different source identification scheme). For example, update identification module 136 may reference a translation table or database which includes a mapping of data sources to source IDs. Update identification module 136 may add, modify, or replace a source ID attribute for each data update received from data sources 104.

Update identification module 136 may be configured to identify a source-specific sequence ID for each data update. A source-specific sequence ID may indicate a position of the data update in a sequence of data updates received from the same data source. In some implementations, a source-specific sequence ID (e.g., a tag, an attribute, a dimension, etc.) may be associated with the data update at the time the update is received (e.g., as embedded data, metadata, etc.). For example, data sources 104 may tag or mark data updates with a source-specific "sequence ID" attribute (e.g., <update_1>, <update_2>, etc.) prior to sending the data updates to update delivery system 110. In some instances, identifying a source-specific sequence ID includes reading the sequence identifier included with the data update.

In other implementations, update identification module 136 determines a source-specific sequence ID for each update. Determining a source-specific sequence ID for a newly-received data update may include identifying the source-specific sequence ID for the most recent previous update from the same data source 104 and assigning the newly-received data update the next sequential ID. For example, if a particular data source has provided data updates "update_1" and "update_2," update identification module 136 may assign the next data update received from the same data source the source-specific sequence ID "update_3" (e.g., assuming updates are received sequentially from data sources 104). In some implementations, the source-specific sequence IDs may define a proper order or sequence in which to deliver the data updates to data consumers 106. Update identification module 136 may output data updates tagged with a source ID attribute and a source-specific sequence ID attribute (e.g., <source_1, update_3>, <source_229, update_418>, etc.).

Still referring to FIG. 2, memory 134 is shown to include a global sequence ID module 138. Global sequence ID module 138 may assign each data update received from any of the plurality of data sources 104 a unique "global sequence ID." The global sequence ID for a data update may indicate a position of the data update in a global sequence of data updates. The global sequence of data updates may include data updates received from multiple data sources 104. The global sequence ID may be used to uniquely identify a particular data update without referring to the data source 104 from which the data update is received.

In some implementations, global sequence ID module 138 assigns each data update a unique global sequence ID based on an order in which the updates are received (e.g., by update delivery system 110, by global sequence ID module 138, etc.). For example, global sequence ID module 138 may assign a first data update received from a first data source (e.g., <source_1, update_1>) a global sequence ID of "global_1." The next data update received by global sequence ID module 138 may be from the same or different data source 104 (e.g., <source_1, update_2>, <source_8, update_1>, etc.). Regardless of the data source 104 from which the next data update is received, global sequence ID module 138 may assign the next data update the next unassigned global sequence ID in the global sequence (e.g., "global_2").

The global sequence IDs assigned by global sequence ID module 138 may be source-independent or source-neutral. This allows data updates from multiple data sources 104 to be organized and/or described as part of a single (e.g., global) sequence. Global sequence ID module 138 may tag or mark each data update with the global sequence ID assigned to the data update. Global sequence ID module 138 may add the assigned global sequence ID as an attribute or dimension in parallel with the source ID attribute and source-specific sequence ID attribute (e.g., <source_1, update_1, global_1>, <source_8, update_1, global_2>, etc.). In some implementations, global sequence ID module may replace the source-specific sequence ID attribute for each data update with the assigned global sequence ID attribute. For example, the resulting data updates may have only a source ID attribute and a global sequence ID attribute (e.g., <source_1, global_1>, <source_8, global_2>, etc.). In some implementations, additional attributes other than a source-specific sequence ID may be present in the attribute data (e.g., an update time attribute, an update size attribute, etc.).

Still referring to FIG. 2, memory 134 is shown to include a transaction database module 140. Transaction database module 140 may maintain a transaction database (e.g., a table, a matrix, a vector, etc.) associating each of the plurality of data sources 104 with the global sequence ID most recently assigned to a data update from the data source. For example, the transaction database may be a table including a first row or column listing a plurality of source IDs (e.g., a source ID for each of data sources 104 from which a data update has been received) and a second row or column listing a plurality of global sequence IDs (e.g., a global sequence ID for each of the listed source IDs). Each source ID in the table may correspond to a single global sequence ID in the table (e.g., the global sequence ID listed in the same row or column as the source ID). The global sequence ID corresponding to a source ID may identify the global sequence ID which was most recently assigned (e.g., by global sequence ID module 138) to any data update having the same source ID.

Transaction database module 140 may update the transaction database each time a global sequence ID is assigned by global sequence ID module 138. Transaction database module 140 may be configured to identify the source IDs and global sequence IDs of the data updates processed by global sequence ID module 138 (e.g., using the attributes of the data update <source_8, global_2>, etc.). If transaction database module 140 determines that a source ID in the transaction database has been associated with a more recent global sequence ID (e.g., by assigning a more recent global sequence ID to a data update having the same source ID), transaction database module 140 may update the transaction database accordingly.

For example, an entry in the transaction database may initially indicate that the most recently assigned global sequence ID to any data update received from "source_314" is "global_2718." However, if another data update from source_314 is assigned the global sequence ID "global_2845," transaction database module 140 may replace global_2718 with global_2845 in the transaction database. After the replacement is made, the transaction database may indicate that the most recently assigned global sequence ID to any update received from source_314 is now global_2845.

In some implementations, transaction database module 140 may add an entry to the transaction database if the identified source ID has not been previously associated with any global sequence IDs (e.g., the first time an update from a particular data source is received). The transaction database may be used to determine the most recent (e.g., highest) global sequence ID assigned to data updates from each of the plurality of data sources 104.

Still referring to FIG. 2, memory 134 is shown to include a previous global sequence ID module 142. Previous global sequence ID module 142 may assign each data update received from data sources 104 a "previous global sequence ID." The previous global sequence ID may correspond to the global sequence ID of a previous data update from the same data source. In some implementations, the previous data update is the most recent previous data update received from the same data source (e.g., assuming updates are received from data sources 104 in the proper delivery sequence). In other implementations, the previous data update may be the data update having the same source ID as the current data update and a source-specific sequence ID immediately preceding the source-specific sequence ID of the current data update. In some implementations, both of these definitions of the previous data update identify the same data update.

Previous global sequence ID module 142 may determine the previous global sequence ID for a data update by referencing the transaction database. For example, each time a new data update is received, previous global sequence ID module 142 may identify the data source 104 of the data update (e.g., using the source ID attribute of the data update). Previous global sequence ID module 142 may use the transaction database to identify the most recently assigned global sequence ID corresponding to the identified data source. The most recently assigned global sequence ID may then be assigned to the new data update as the "previous global sequence ID" of the new data update.

Previous global sequence ID module 142 may add the identified previous global sequence ID as an attribute of the new data update. For example, in some implementations, a data update may include a source ID attribute, a source-specific sequence ID attribute, a global sequence ID attribute, and a previous global sequence ID attribute (e.g., <source_314, update_15, global_2845, previous_2718>). In some implementations, the source ID attribute and/or source-specific sequence ID attribute may be dropped. For example, the resulting data updates may have only a global sequence ID attribute and a previous global sequence ID attribute (e.g., <global_2845, previous_2718>, etc.). In some implementations, additional attributes other than the source ID and/or the source-specific sequence ID may be present in the attribute data (e.g., an update time attribute, an update size attribute, etc.).

Update delivery system 110 may use the previous global sequence ID of a new data update to determine whether the new data update may be delivered to data consumers 106. For example, the previous global sequence ID of the new data update may identify the most recent previous data update from the same data source 104 as the new data update. If the most recent previous data update from the same data source 104 has already been delivered to data consumers 106, update delivery system 110 may determine that the new data update is the next update in the sequence of updates from the same data source 104 and can be delivered to data consumers 106 without violating the prescribed delivery order. Update delivery system 110 may keep track of which data updates have been delivered to data consumers 106 using the global sequence IDs assigned to each of the data updates.

Still referring to FIG. 2, memory 134 is shown to include a low water mark module 144. Low water mark module 144 may keep track of which data updates have been delivered to data consumers 106 using the concept of a "Low Water Mark" (LWM). Low water mark module 144 may use a LWM to summarize a range of global sequence IDs which have been delivered to data consumers 106. For example, if all data updates having a global sequence ID less than two hundred have been delivered, low water mark module 144 may set the LWM at two hundred.

If a non-delivered update has a previous global sequence ID less than the LWM, update delivery system 110 may determine that the most recent previous data update from the same data source has already been delivered and may proceed to deliver the non-delivered update to data consumers 106. By assigning each data update a global sequence ID and a previous global sequence ID and by using the LWM concept to summarize a range of global sequence IDs, update delivery system 110 can determine whether to deliver a non-delivered update without storing an amount of state information proportional to the number of data sources 104.

In some implementations, low water mark module 144 may be configured to update the LWM. For example, a LWM of two hundred (e.g., LWM=200) may indicate that all data updates having a global sequence ID of less than two hundred have been delivered (e.g., global_1-global_199). If a new data update having a global sequence ID equal to the LWM (e.g., global_200) is delivered to data consumers 106, low water mark module 144 may update the LWM accordingly. For example, low water mark module 144 may increase the LWM to LWM=201 to indicate that all data updates having a global sequence ID less than global_201 have been delivered (e.g., global_1-global_200).

Still referring to FIG. 2, memory 134 is shown to include a high water mark module 146. High water mark module 146 may keep track of the maximum global sequence ID assigned by global sequence ID module 138. High water mark module 146 may store or record the maximum assigned global sequence ID as a "High Water Mark" (HWM). For example, if global sequence ID module 138 has assigned global sequence IDs global_1 through global_314, high water mark module 146 may set the HWM to HWM=314. The difference between the HWM and the LWM (e.g., HWM-LWM) may indicate a number of global sequence IDs which cannot be summarized using the LWM. Accordingly, the amount of state information required to determine which data updates have been delivered to data consumers 106 may be proportional to the difference between the HWM and the LWM.

Still referring to FIG. 2, memory 134 is shown to include a delivery determination module 148. Delivery determination module 148 may be configured to determine the proper order or sequence in which to deliver data updates to data consumers 106. In some implementations, delivery determination module 148 determines that a non-delivered data update can properly be delivered if the data update identified by the previous global sequence ID of the non-delivered data update (e.g., the "preceding data update") has already been delivered.

Delivery determination module 148 may determine whether the preceding data update has been delivered by comparing the global sequence ID of the preceding data update (e.g., "$global_{prev}$") with the LWM. If the global sequence ID of the preceding data update is less than the LWM (e.g, $global_{prev}$<LWM), delivery determination module 148 may determine that the preceding data update has been delivered. If the global sequence ID of the preceding data update is not less than the LWM (e.g., $global_{prev}$≥LWM), delivery determination module 148 may require additional information to determine whether the preceding data update has been delivered.

In some implementations, delivery determination module 148 maintains a list of previous global sequence IDs which have been delivered to data consumers 106. The list maintained by delivery determination module 148 may only apply to previous global sequence IDs which are greater than the LWM (e.g., $global_{prev}$>LWM) because the LWM can be interpreted as the lowest global sequence ID which has not yet been delivered. Additionally, the list maintained by delivery determination module 148 may only apply to previous global sequence IDs which are not greater than the HWM (e.g., $global_{prev}$≤HWM) because global sequence IDs greater than the HWM have not yet been assigned by global sequence ID module 138. Thus, the range of previous global sequence IDs included in the list maintained by delivery determination module 148 may be bounded by the LWM and the HWM (e.g., LWM<$global_{prev}$≤HWM).

Each time a data update is delivered to data consumers 106, delivery determination module 148 may add the global sequence ID of the data update to the list. Delivery determination module 148 may remove a global sequence ID from the list if the global sequence ID is less than or equal to the LWM. In some implementations, delivery determination module 148 removes a global sequence ID from the list if the global sequence ID matches the previous global sequence ID of another data update on the list and/or if a subsequent data update from the same data source has been delivered. It may be unnecessary to store multiple global sequence IDs associated with the same data source 104. The list maintained by delivery determination module 148 may include one global sequence ID for each data source 104 from which a data update has been delivered to data consumers 106, bounded by the LWM and the HWM.

The amount of state information used by delivery determination module 148 to determine which data updates have been delivered may be proportional to the difference between the HWM and the LWM. This allows update delivery system 110 to be scalable to any number of data sources (e.g., thousands, millions, billions, etc.) without requiring a proportional amount of state information to be tracked, stored, or otherwise maintained. The amount of state information maintained by delivery determination module 148 may further be reduced by removing all but one of the global sequence IDs that are associated with the same data source from the list of global sequence IDs bounded by the LWM and the HWM. In some implementations, the amount of state information used by delivery determination module 148 to determine which data updates have been delivered may be proportional to the number of data sources having a data update with a global sequence ID between the LWM and the HWM.

Still referring to FIG. 2, memory 134 is shown to include an update delivery module 150. Update delivery module 150 may be configured to deliver non-delivered data updates to data consumers 106. In some implementations, update delivery module 150 delivers a non-delivered data update to data consumers 106 in response to a determination (e.g., by delivery determination module 148) that the non-delivered data update may be properly delivered.

Update delivery module 150 can isolate and deliver updates from each of the plurality of data sources 104 independently without waiting to deliver updates from other data sources. For example, update delivery module 150 may deliver a non-delivered data update if the update identified by the previous global sequence ID of the non-delivered data update has already been delivered. For implementations in which the previous global sequence ID identifies a data update received from the same data source (e.g., the most recent previous update from the same data source as defined by transaction database module 140), the determination of whether to deliver a non-delivered data may depend only upon whether previous updates from the same data source have been delivered. This allows the delivery sequences of data updates from each of the plurality of data sources 104 to be truly independent. For example, a non-delivered update from a first data source will not delay delivery of an update from a second data source. By using the concept of a low water mark to determine which updates have already been delivered, update delivery system 110 is scalable to any number of data sources 104 without requiring a proportional amount of state information to be maintained.

Figure 3:
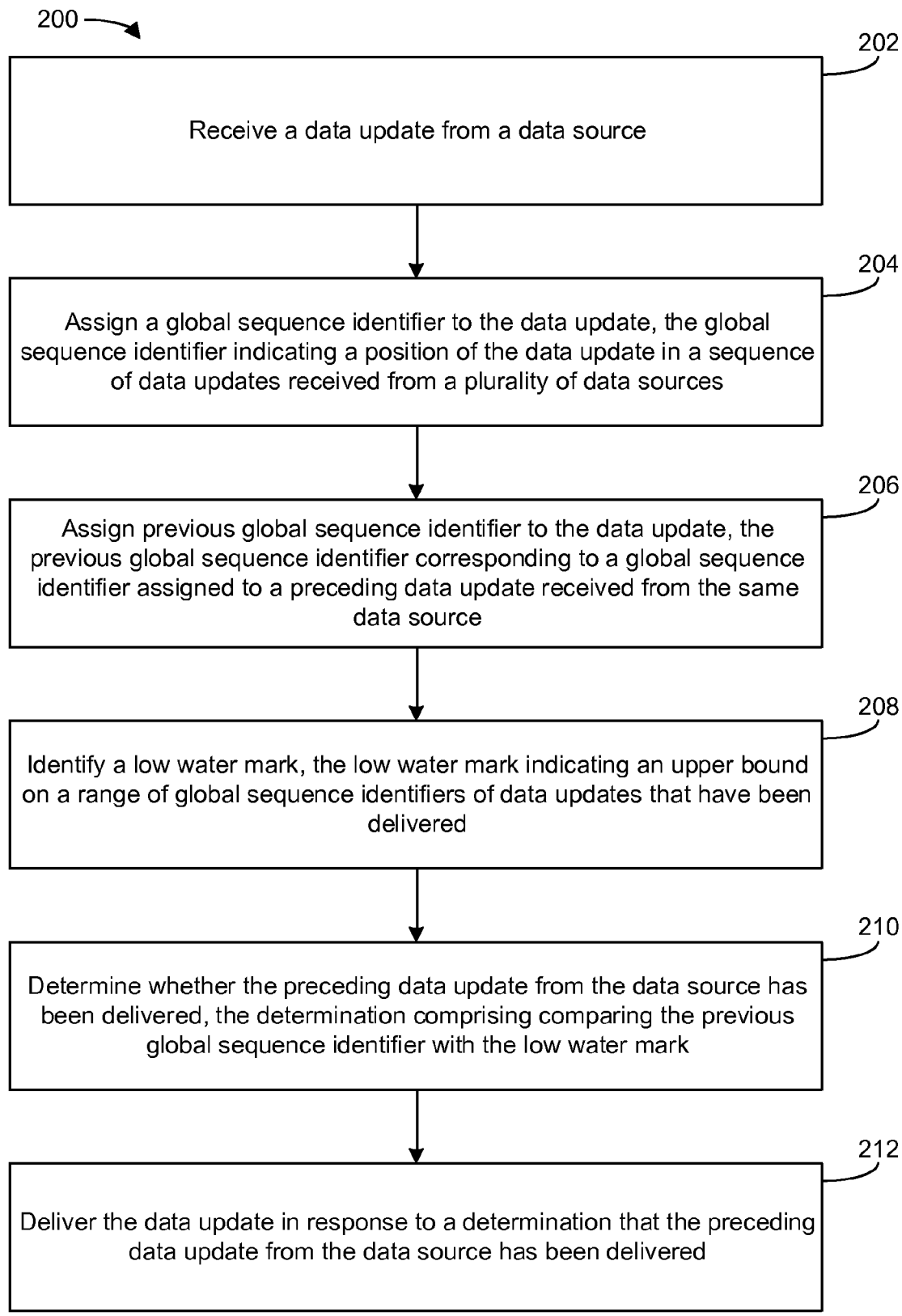
FIG. 3 is a flowchart of a scalable process for delivering ordered data updates from a plurality of data sources, shown according to a described implementation.

Referring now to FIG. 3, a flowchart of a process 200 for delivering ordered data updates from a plurality of data sources is shown, according to a described implementations. Process 200 may be performed by update delivery system 110 using one or more of memory modules 136-150 described with reference to FIG. 2. Process 200 is a scalable process. Process 200 may be used to deliver ordered data updates from any number of data sources (e.g., thousands, millions, billions, etc.) without requiring a proportional amount of state information to be maintained.

Process 200 is shown to include receiving a data update from a data source (step 202). In some implementations, the data update may be received from data sources 104 (e.g., via network 102 and communications interface 120). Data sources may include any type of data source capable of generating, creating, providing, relaying, transmitting, or otherwise communicating data updates to update delivery system 110. For example, as shown in FIG. 1, data sources may include content providers 112 (e.g., customers, advertisers, resource operators, business owners, etc.), user devices 114 (e.g., desktop computers, laptop computers, smartphones, tablets, mobile communication devices, remote workstations, client terminals, entertainment consoles, etc.), electronic resources 116 (e.g., web pages, word processing documents, portable document format (PDF) documents, images, video, programming elements, interactive content, streaming video/audio sources, etc.), and/or any other data source capable of providing a data structure to update delivery system 110.

Data updates may include, for example, updates to an online account or profile (e.g., updated user information, updated account information, updated profile information, etc.), updates to configuration settings or parameters used to control a device or system (e.g., updated tuning parameters, control parameters, control logic, etc.), updates to a listing of keywords or keyword bids used by a content serving system, updates to measurement or sensory data, updates to a data log (e.g., an event log, a web hits log, etc.), or any other type of data update which may be used to modify or replace an existing data structure and/or to create a new data structure. Data updates may include updates to campaign parameters used to control the distribution of content items to user devices 114 (e.g., keywords, bids, a content distribution budget, geographic limiters, etc.), updates to a set of content items, updates to behavior metrics, updates to transaction data or event data (e.g., impression events, click events, online purchases, etc.), or updates to any other type of data or data structure.

In some implementations, the data updates are delta updates (e.g., updates which build upon or refer to a preexisting data structure). Delta updates may only make sense semantically if delivered to the data consumer in a particular order (e.g., the order in which the updates are generated by the data source). Process 200 may be used to ensure that data updates received from a particular data source are delivered to the data consumer in the proper order or sequence.

In some implementations, the data updates include a data source identifier (e.g., a tag, an attribute, a dimension, etc.) at the time the data updates are initially received (e.g., as embedded data, metadata, etc.). For example, data sources 104 may tag or mark data updates with a "source ID" attribute (e.g., <source_1>, <source_2>, etc.) prior to sending the data updates to update delivery system 110. In some implementations, the data updates may include a source-specific sequence ID (e.g., a tag, an attribute, a dimension, etc.) at the time the data updates are received. For example, data sources 104 may tag or mark data updates with a source-specific "sequence ID" attribute (e.g., <update_1>, <update_2>, etc.) prior to sending the data updates to update delivery system 110. In some implementations, step 202 includes identifying, formatting, replacing, converting, adding, and or tagging the data updates with a source ID attribute and a source-specific sequence ID attribute (e.g., <source_1, update_3>, <source_229, update_418>, etc.).

Still referring to FIG. 3, process 200 is shown to include assigning a global sequence identifier to the data update (step 204). In some implementations, step 204 may be performed by global sequence ID module 138. The global sequence identifier (e.g., the "global sequence ID") may indicate a position of the data update in a sequence of data updates received from a plurality of data sources. For example, a first data update received from a first data source (e.g., <source_1, update_1>) may be assigned a global sequence ID of "global_1." The next data update received may be from the same or different data source (e.g., <source_1, update_2>, <source_8, update_1>, etc.). Regardless of the data source from which the next data update is received, step 204 may include assigning the next data update the next unassigned global sequence ID in the global sequence (e.g., "global_2"). The global sequence IDs assigned in step 204 may be source-independent or source-neutral. This allows data updates from multiple data sources to be organized and/or described as part of a single (e.g., global) sequence.

In some implementations, step 204 includes tagging or marking each data update with the global sequence ID assigned to the data update. The assigned global sequence ID may be added as an attribute or dimension in parallel with the source ID attribute and source-specific sequence ID attribute (e.g., <source_1, update_1, global_1>, <source_8, update_1, global_2>, etc.). In some implementations, step 204 includes replacing the source-specific sequence ID attribute for each data update with the assigned global sequence ID attribute. For example, the resulting data updates may have only a source ID attribute and a global sequence ID attribute (e.g., <source_1, global_1>, <source_8, global_2>, etc.). In some implementations, additional attributes other than a source-specific sequence ID may be present in the attribute data (e.g., an update time attribute, an update size attribute, etc.).

Still referring to FIG. 3, process 200 is shown to include assigning a previous global sequence identifier to the data update (step 206). In some implementations, step 206 is performed by previous global sequence ID module 142. The previous global sequence identifier (e.g., the "previous global sequence ID") may be a global sequence identifier that was previously assigned to a preceding data update received from the same data source. In some implementations, the preceding data update is the most recent previous data update received from the same data source (e.g., assuming updates are received from data sources 104 in the proper delivery sequence).

In some implementations, step 206 may include determining the previous global sequence ID for a data update by referencing a transaction database (e.g., a table, a matrix, a vector, etc.) relating each of the plurality of data sources to a global sequence ID most recently assigned to a data update from the data source. For example, the transaction database may be a table including an identifier for each of the plurality of data sources (e.g., a data source ID, a customer ID, etc.) and a global sequence ID associated with each of the data source identifiers. Each time a global sequence ID is assigned to a data update from a particular data source, the global sequence ID associated with the particular data source may be updated in the transaction database. The transaction database may be used to determine the most recent (e.g., highest) global sequence ID assigned to data updates from each of the plurality of data sources.

Step 206 may include identifying the data source of the data update (e.g., using the source ID attribute of the data update) each time a new data update is received. The transaction database may be used to identify the most recently assigned global sequence ID corresponding to the identified data source. The most recently assigned global sequence ID may then be assigned to the new data update as the previous global sequence ID of the new data update.

In some implementations, step 206 includes add the identified previous global sequence ID as an attribute of the new data update. For example, a data update may include a source ID attribute, a source-specific sequence ID attribute, a global sequence ID attribute, and a previous global sequence ID attribute (e.g., <source_314, update_15, global_2845, previous_2718>). In some implementations, the source ID attribute and/or source-specific sequence ID attribute may be dropped. For example, the resulting data updates may have only a global sequence ID attribute and a previous global sequence ID attribute (e.g., <global_2845, previous_2718>, etc.). In some implementations, additional attributes other than the source ID and/or the source-specific sequence ID may be present in the attribute data (e.g., an update time attribute, an update size attribute, etc.).

Still referring to FIG. 3, process 200 is shown to include identifying a low water mark (step 208). The low water mark (LWM) may be an upper bound on a range of global sequence IDs associated with data updates which have been delivered. In some implementations, all data updates having a global sequence identifier within the range of global sequence identifiers bounded by the LWM have been delivered. The LWM may be used to summarize a range of global sequence IDs which have been delivered to data consumers 106. For example, if all data updates having a global sequence ID less than two hundred have been delivered, the LWM may be set at two hundred.

Still referring to FIG. 3, process 200 is shown to include determining whether the preceding data update from the data source has been delivered (step 210). In some implementations, step 210 includes comparing the previous global sequence ID (e.g., the global sequence ID of the preceding data update "$global_{prev}$") with the LWM. If the global sequence ID of the preceding data update is less than the LWM (e.g, $global_{prev}$<LWM), step 210 may include determining that the preceding data update has been delivered. However, if the global sequence ID of the preceding data update is not less than the LWM (e.g., $global_{prev}$≥LWM), step 210 may include obtaining additional information to determine whether the preceding data update has been delivered.

In some implementations, step 210 includes maintaining a list of previous global sequence IDs which have been delivered to data consumers 106. The list maintained in step 210 may include only global sequence IDs which are greater than the LWM (e.g., $global_{prev}$>LWM) because global sequence IDs less than the LWM can be summarized using the LWM. Additionally, the list maintained in step 210 may include only global sequence IDs which are not greater than the HWM (e.g., $global_{prev}$ HWM) because global sequence IDs greater than the HWM have not yet been assigned. Thus, the range of previous global sequence IDs included in the list maintained by delivery determination module 148 may be bounded by the LWM and the HWM (e.g., LWM<$global_{prev}$≤HWM).

The amount of state information used in step 210 determine which data updates have been delivered may be proportional to the difference between the HWM and the LWM. This allows process 200 to be scalable to any number of data sources (e.g., thousands, millions, billions, etc.) without requiring a proportional amount of state information to be tracked, stored, or otherwise maintained. The amount of state information used in step 210 may further be reduced by removing all but one of the global sequence IDs that are associated with the same data source from the list of global sequence IDs bounded by the LWM and the HWM. In some implementations, the amount of state information used in step 210 to determine which data updates have been delivered may be proportional to the number of data sources having a data update with a global sequence ID between the LWM and the HWM.

Still referring to FIG. 3, process 200 is shown to include delivering the data update (step 212). In some implementations, step 212 may be performed in response to a determination that the preceding data update from the data source has been delivered. Process 200 can be used to isolate and deliver updates from each of the plurality of data sources independently without waiting to deliver updates from other data sources. For example, step 212 may include delivering a non-delivered data update if the update identified by the previous global sequence ID of the non-delivered data update (e.g., a previous update from the same data source) has already been delivered.

For implementations in which the previous global sequence ID identifies a data update received from the same data source, the condition for performing step 212 (e.g., the result of step 210) may depend only upon whether previous updates from the same data source have been delivered. This advantage allows the delivery sequences of data updates from each of the plurality of data sources 104 to be truly independent. For example, a non-delivered update from a first data source will not delay delivery of an update from a second data source. By using the concept of a low water mark to determine which updates have already been delivered, update delivery system 110 is scalable to any number of data sources 104 without requiring a proportional amount of state information to be maintained.

Figure 4:
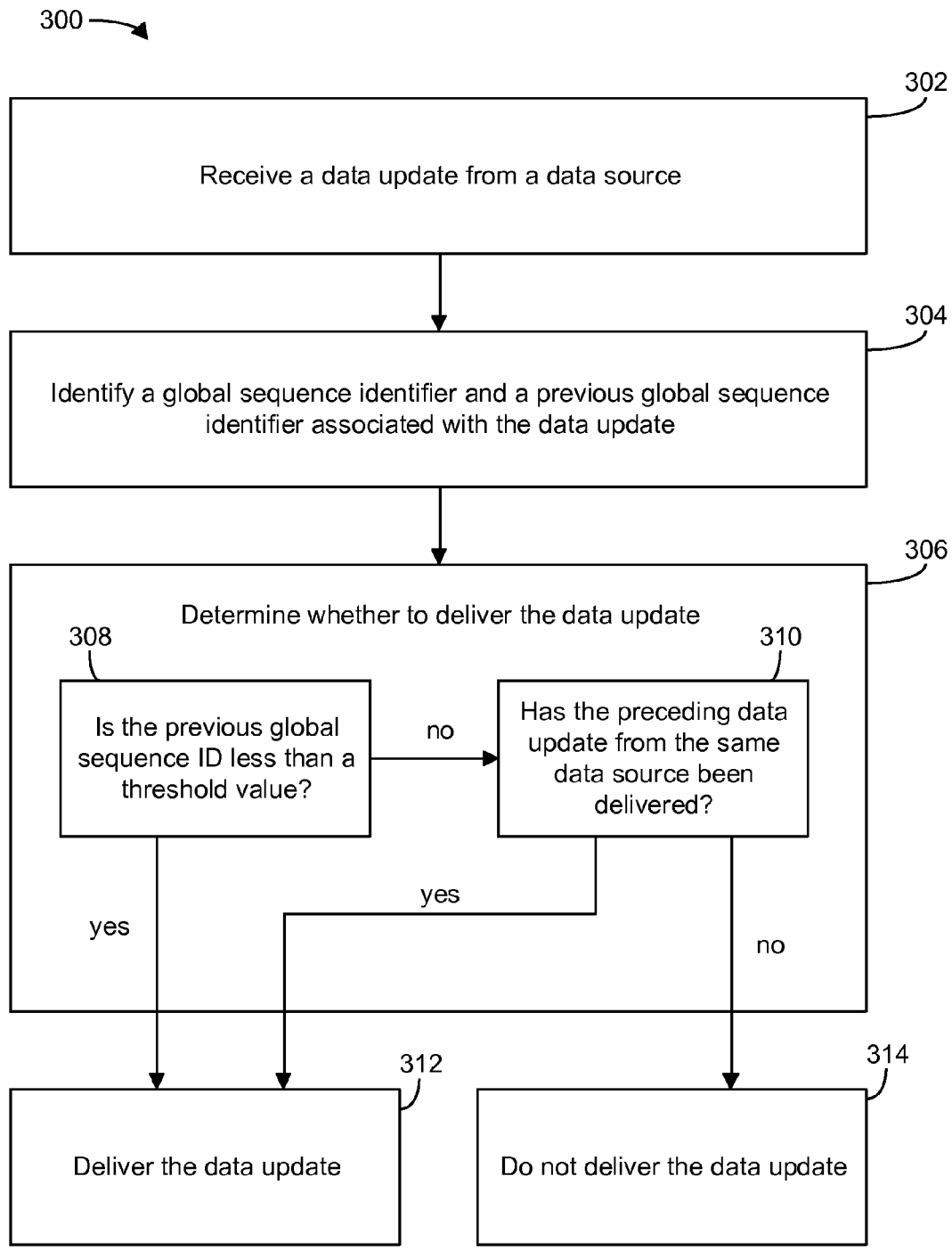
FIG. 4 is a flowchart of a scalable process for determining whether to deliver a data update, shown according to a described implementation.

Referring now to FIG. 4, a flowchart of a process 300 for delivering ordered data updates from a plurality of data sources is shown, according to a described implementations. Process 300 may be performed by update delivery system 110 using one or more of memory modules 136-150 described with reference to FIG. 2. Process 300 is a scalable process. Process 300 may be used to deliver ordered data updates from any number of data sources (e.g., thousands, millions, billions, etc.) without requiring a proportional amount of state information to be maintained.

Process 300 is shown to include receiving a data update from a data source (step 302). In some implementations, the data update may be received from data sources 104 (e.g., via network 102 and communications interface 120). Data sources may include any type of data source capable of generating, creating, providing, relaying, transmitting, or otherwise communicating data updates to update delivery system 110. For example, as shown in FIG. 1, data sources may include content providers 112 (e.g., customers, advertisers, resource operators, business owners, etc.), user devices 114 (e.g., desktop computers, laptop computers, smartphones, tablets, mobile communication devices, remote workstations, client terminals, entertainment consoles, etc.), electronic resources 116 (e.g., web pages, word processing documents, portable document format (PDF) documents, images, video, programming elements, interactive content, streaming video/audio sources, etc.), and/or any other data source capable of providing a data structure to update delivery system 110.

Data updates may include, for example, updates to an online account or profile (e.g., updated user information, updated account information, updated profile information, etc.), updates to configuration settings or parameters used to control a device or system (e.g., updated tuning parameters, control parameters, control logic, etc.), updates to a listing of keywords or keyword bids used by a content serving system, updates to measurement or sensory data, updates to a data log (e.g., an event log, a web hits log, etc.), or any other type of data update which may be used to modify or replace an existing data structure and/or to create a new data structure. Data updates may include updates to campaign parameters used to control the distribution of content items to user devices 114 (e.g., keywords, bids, a content distribution budget, geographic limiters, etc.), updates to a set of content items, updates to behavior metrics, updates to transaction data or event data (e.g., impression events, click events, online purchases, etc.), or updates to any other type of data or data structure.

In some implementations, the data updates are delta updates (e.g., updates which build upon or refer to a preexisting data structure). Delta updates may only make sense semantically if delivered to the data consumer in a particular order (e.g., the order in which the updates are generated by the data source). Process 300 may be used to ensure that data updates received from a particular data source are delivered to the data consumer in the proper order or sequence.

In some implementations, the data updates include a data source identifier (e.g., a tag, an attribute, a dimension, etc.) at the time the data updates are initially received (e.g., as embedded data, metadata, etc.). For example, data sources 104 may tag or mark data updates with a "source ID" attribute (e.g., <source_1>, <source_2>, etc.) prior to sending the data updates to update delivery system 110. In some implementations, the data updates may include a source-specific sequence ID (e.g., a tag, an attribute, a dimension, etc.) at the time the data updates are received. For example, data sources 104 may tag or mark data updates with a source-specific "sequence ID" attribute (e.g., <update_1>, <update_2>, etc.) prior to sending the data updates to update delivery system 110. In some implementations, step 302 includes identifying, formatting, replacing, converting, adding, and or tagging the data updates with a source ID attribute and a source-specific sequence ID attribute (e.g., <source_1, update_3>, <source_229, update_418>, etc.).

Still referring to FIG. 4, process 300 is shown to include identifying a global sequence identifier and a previous global sequence identifier associated with the data update (step 304). The global sequence identifier may indicate a position of the data update in a sequence of data updates received from a plurality of data sources. For example, a first data update received from a first data source (e.g., <source_1, update_1>) may have a global sequence ID of "global_1." The next data update received may be from the same or different data source (e.g., <source_1, update_2>, <source_8, update_1>, etc.). Regardless of the data source from which the next data update is received, the next data update may have the next unassigned global sequence ID in the global sequence (e.g., "global_2"). The global sequence IDs identified in step 304 may be source-independent or source-neutral. This advantage allows data updates from multiple data sources to be organized and/or described as part of a single (e.g., global) sequence.

The previous global sequence identifier may be a global sequence identifier that was previously assigned to a preceding data update received from the same data source. In some implementations, the preceding data update is the most recent previous data update received from the same data source (e.g., assuming updates are received from data sources 104 in the proper delivery sequence).

Still referring to FIG. 4, process 300 is shown to include determining whether to deliver the data update (step 306). Step 306 is shown to include comparing the previous global sequence identifier with a threshold value (step 308). The threshold value may be an upper bound on a range of global sequence identifiers of data updates that have been delivered. For example, if all data updates having a global sequence ID less than two hundred have been delivered, the threshold value may be two hundred. In some implementations, the threshold value may be a low water mark (LWM). If a result of the comparison conducted in step 308 reveals that the previous global sequence identifier is less than the threshold value, the data update may be delivered (step 312).

If the result of the comparison conducted in step 308 reveals that the previous global sequence identifier is not less than the threshold value, step 306 may further include determining whether the preceding data update received from the same data source has been delivered (step 310). In some implementations, step 310 includes obtaining delivery status information for the preceding data update from a delivery status database. The delivery status database may include delivery status information only for data updates having a global sequence identifier that is not less than the threshold value (e.g., global$_{prev}$≥threshold), thereby reducing the amount of state information maintained to perform step 306. The reduced amount of state information may be sufficient to complete step 310 because step 310 may be performed only for data updates having a previous global sequence identifier that is not less than the threshold value (e.g., a negative determination in step 308).

If the result of the determination in step 310 reveals that the preceding data update has been delivered, the data update may be delivered (step 312). However, if the result of the determination in step 310 reveals that the preceding data update has not been delivered, the data update may not be delivered (step 314). Process 300 may ensure that a data update is delivered only if the preceding update has already been delivered, thereby facilitating a proper delivery sequence.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A scalable method for delivering ordered data updates from a plurality of data sources, the method comprising:
   receiving, at a computer system, data updates from a plurality of data sources;
   assigning, by the computer system, a global sequence identifier to each data update, wherein the global sequence identifier assigned to a data update indicates a position of the data update in a global sequence of data updates comprising the data updates received from each of the plurality of data sources;
   assigning, by the computer system, a previous global sequence identifier to each data update, wherein the previous global sequence identifier assigned to a data update is the global sequence identifier assigned to a preceding data update received from the same data source;
   identifying a low water mark, wherein the low water mark is a maximum of the global sequence identifiers for which all of the data updates in the global sequence having a lesser global sequence identifier have been delivered;
   determining, by the computer system for each data update, whether the preceding data update from the same data source has been delivered without requiring independent delivery status information to be maintained for each of the plurality of data sources, the determination comprising comparing the previous global sequence identifier of each data update with the low water mark; and
   delivering each data update in response to a determination that the preceding data update from the same data source has been delivered.

2. The method of claim 1, wherein the preceding data update is a most recent previous data update received from the same data source.

3. The method of claim 1, wherein each of the data updates includes a source-specific sequence identifier indicating a position of the data update in a sequence of data updates received from the same data source, wherein the sequence of data updates received from the same data source defines an order in which a plurality of data updates from the same data source must be delivered.

4. The method of claim 1, further comprising:
   maintaining a transaction database including a data source identifier for each of the plurality of data sources and a global sequence identifier associated with each data source identifier;
   identifying, in the transaction database, the data source identifier corresponding to the data source from which a data update is received; and
   updating, in the transaction database, the global sequence identifier associated with the identified data source identifier, wherein updating the associated global sequence identifier in the transaction database comprises replacing the associated global sequence identifier in the transaction database with the global sequence identifier assigned to the data update.

5. The method of claim 4, wherein assigning the previous global sequence identifier to the data update comprises:
   identifying the global sequence identifier associated with the identified data source identifier, wherein identifying the global sequence identifier is performed prior to updating the global sequence identifier; and
   using the identified global sequence identifier as the previous global sequence identifier assigned to the data update.

6. The method of claim 1, further comprising:
   comparing a global sequence identifier of a delivered data update with the low water mark; and
   determining whether to update the low water mark based on a result of the comparison.

7. The method of claim 6, wherein determining whether to update the low water mark based on a result of the comparison comprises determining whether the global sequence identifier of the delivered data update matches the low water mark,
   the method further comprising increasing the low water mark in response to a determination that the global sequence identifier of the delivered data update matches the low water mark.

8. A scalable system for delivering ordered data updates from a plurality of data sources, the system comprising:
   a communications interface configured to receive data updates from a plurality of data sources; and
   a processing circuit comprising a processor and a non-transitory computer-readable storage medium comprising:
      a global sequence ID module configured to assign a global sequence identifier to each data update, wherein the global sequence identifier assigned to a data update indicates a position of the data update in a global sequence of data updates comprising data updates received from each of the plurality of data sources;
      a previous global sequence ID module configured to assign a previous global sequence identifier to each data update, wherein the previous global sequence identifier assigned to a data update is the global sequence identifier assigned to a preceding data update received from the same data source;
      a low water mark module configured to identify a low water mark, wherein the low water mark is a maximum of the global sequence identifiers for which all of the data updates in the global sequence having a lesser global sequence identifier have been delivered;
  a delivery determination module configured to determine, for each data update, whether the preceding data update from the same data source has been delivered without requiring independent delivery status information to be maintained for each of the plurality of data sources, the determination comprising comparing the previous global sequence identifier of each data update with the low water mark; and
  an update delivery module configured to deliver each data update in response to a determination that the preceding data update from the same data source has been delivered.

9. The system of claim 8, wherein the preceding data update is a most recent previous data update received from the same data source.

10. The system of claim 8, wherein each of the data updates includes a source-specific sequence identifier indicating a position of the data update in a sequence of data updates received from the same data source,
  wherein the sequence of data updates received from the same data source defines an order in which to deliver a plurality of data updates from the same data source.

11. The system of claim 8, wherein the processing circuit further comprises a transaction database module configured to:
  maintain a transaction database including a data source identifier for each of the plurality of data sources and a global sequence identifier associated with each data source identifier;
  identify, in the transaction database, the data source identifier corresponding to the data source from which a data update is received; and
  update, in the transaction database, the global sequence identifier associated with the identified data source identifier, wherein updating the associated global sequence identifier in the transaction database comprises replacing the associated global sequence identifier in the transaction database with the global sequence identifier assigned to the data update.

12. The system of claim 11, wherein assigning the previous global sequence identifier to the data update comprises:
  identifying, in the transaction database, the global sequence identifier associated with the identified data source identifier, wherein identifying the global sequence identifier is performed prior to updating the global sequence identifier; and
  using the identified global sequence identifier as the previous global sequence identifier assigned to the data update.

13. The system of claim 8, wherein the low water mark module is further configured to:
  compare the global sequence identifier of a delivered data update with the low water mark; and
  determine whether to update the low water mark based on a result of the comparison.

14. The system of claim 13, wherein determining whether to update the low water mark based on a result of the comparison comprises determining whether the global sequence identifier of the delivered data update matches the low water mark,
  wherein the low water mark module is further configured to increase the low water mark in response to a determination that the global sequence identifier of the delivered data update matches the low water mark.

15. A scalable method for delivering ordered data updates from a plurality of data sources, the method comprising:
  receiving, at a computer system, data updates from a plurality of data sources;
  identifying, by the computer system, a global sequence identifier and a previous global sequence identifier associated with each data update, wherein the global sequence identifier of a data update indicates a position of the data update in a global sequence of data updates comprising data updates received from each of the plurality of data sources, and wherein the previous global sequence identifier of a data update is the global sequence identifier associated with a preceding data update received from the same data source;
  determining, by the computer system, whether to deliver each data update without requiring independent delivery state information to be maintained for each of the plurality of data sources, wherein determining whether to deliver a data update comprises comparing the previous global sequence identifier of the data update with a threshold value that applies to data updates from each the plurality of data sources; and
  delivering each data update in response to a determination that the previous global sequence identifier of the data update is less than the threshold value, wherein the threshold value is a maximum of the global sequence identifiers for which all of the data updates in the global sequence having a lesser global sequence identifier have been delivered.

16. The method of claim 15, wherein determining whether to deliver a data update further comprises, in response to a determination that the previous global sequence identifier of the data update is not less than the threshold value, determining whether the preceding data update received from the same data source has been delivered, the method further comprising:
  delivering the data update in response to a determination that the preceding data update received from the same data source has been delivered.

17. The method of claim 16, wherein determining whether the preceding data update received from the data source has been delivered comprises:
  obtaining delivery status information for the preceding data update from a delivery status database, wherein the delivery status database includes delivery status information for only data updates having a global sequence identifier that is not less than the threshold value.

18. The method of claim 15, further comprising:
  determining whether to increase the threshold value, wherein determining whether to increase the threshold value is performed in response to at least one of: a decision to deliver the data update, and delivering the data update.

19. The method of claim 18, wherein determining whether to increase the threshold value comprises:
  identifying a lowest global sequence identifier exceeding the threshold value;
  determining whether the global sequence identifier of a delivered data update matches the identified lowest global sequence identifier; and
  deciding to increase the threshold value in response to a determination that the global sequence identifier of the delivered data update matches the identified lowest global sequence identifier.

* * * * *